(12) United States Patent
Nakamura

(10) Patent No.: US 6,520,011 B2
(45) Date of Patent: Feb. 18, 2003

(54) POWDER DETECTING CAPACITANCE-TYPE SENSOR

(75) Inventor: Akira Nakamura, Tokyo (JP)

(73) Assignee: Nihon Parkerizing Co., Ltd., Tokyo (JP)

( * ) Notice: Subject to any disclaimer, the term of this patent is extended or adjusted under 35 U.S.C. 154(b) by 0 days.

(21) Appl. No.: 09/865,617

(22) Filed: May 29, 2001

(65) Prior Publication Data

US 2001/0048312 A1 Dec. 6, 2001

(30) Foreign Application Priority Data

May 31, 2000 (JP) ........................................ 2000-162504

(51) Int. Cl.[7] ........................... G01F 23/26; G01F 23/00
(52) U.S. Cl. ................................... 73/304 C; 73/290 R
(58) Field of Search ........................... 73/290 R, 304 C, 73/304 R

(56) References Cited

U.S. PATENT DOCUMENTS 4,176,553 A * 12/1979 Wood ........................ 73/304 C
5,305,714 A * 4/1994 Sekiguchi et al. ............. 123/3

* cited by examiner

*Primary Examiner*—Daniel S. Larkin
*Assistant Examiner*—Rodney Frank
(74) *Attorney, Agent, or Firm*—Wenderoth, Lind & Ponack, L.L.P.

(57) ABSTRACT

A powder detecting capacitance-type sensor having a protection cover disposed inside of a powder tank so as to cover a sensor body. The protection cover is made of porous material to permit compressed air to communicate from an inner surface to an outer surface of the protection cover. The protection cover is made of half-sinter of e.g. polyethylene. Also, a space, which is enclosed by the protection cover, the cover guide and the sensor body, is in communication with an air inlet. Thus, compressed air can be introduced into the air inlet and blown outside through the protection cover to prevent powder from attaching or depositing on the protection cover.

7 Claims, 1 Drawing Sheet

POWDER DETECTING CAPACITANCE-TYPE SENSOR

BACKGROUND OF THE INVENTION

1. Field of the Invention

The present invention relates to a powder detecting capacitance-type sensor, and in particular to a level sensor for detecting the height of a powder layer in a tank which holds the powder.

2. Description of the Related Art

FIG. 2. shows an example of an electrostatic powder coating apparatus using a powder detecting capacitance-type sensor. The electrostatic powder coating apparatus 1 charges static electricity to a powder and conducts a uniform and thin coating to an object, which is grounded to the earth, by applying an electric Coulomb force. The powder coating material 2 is supplied from a powder tank 3 to a coating gun 5 through an injector 4. Also the powder coating material 2 is ejected with a carrying air flow from a nozzle opening, which is formed at the end of the coating gun 5, toward the object. At this time, high voltage is charged to electrodes disposed at the end of the coating gun 5 to generate corona discharge from the electrodes of the coating gun 5 toward the object. The powder coating material 2 is charged by ions generated due to the corona discharge and is coated on the surface of the object due to the carrying air flow and electric lines of force.

A capacitance-type sensor 10 is disposed on the side wall 8 of the powder tank 3 and is adapted to sense a powder layer level 7 corresponding to the height of powder coating material 2 in the powder tank 3. In addition to the capacitance-type sensor 10, sensors such a pressure-type, laser-type, sonic-type, vibration-type etc. are used as powder level sensors for detecting the powder layer level 7. However, the capacitance-type sensor 10 has an advantage with respect to the cost and space necessary for accommodating it compared with the other types of sensors. The capacitance-type sensor 10 includes a pair of interior electrodes 11 and detects the existence of powder adjacent the sensor or the amount of powder by utilizing the change of capacitance between the electrodes 11. When the powder coating material 2, of which the dielectric constant is different from that of air, has accumulated in an amount that is high enough to cover the sensor 10, the capacitance between the electrodes 11 changes and the capacitance-type sensor 10 can detect that the powder coating material 2 has accumulated to the determined height.

However, in some cases the powder coating material 2 will attach and deposit on a surface of the capacitance-type sensor 10. In this case, the capacitance-type sensor 10 detects the existence of the powder at all times regardless of the powder layer level 7 in the powder tank 3, and thus there is a problem in that the sensor 10 erroneously detects the powder layer level 7.

The powder coating material 2 can be blown off of the capacitance-type sensor 10 with compressed air 9. However, the effectiveness of the compressed air is not sufficient and the surface of the capacitance-type sensor 10 can become worn due to the powder coating material 2.

SUMMARY OF THE INVENTION

Accordingly, an object of the present invention is to provide a capacitance-type sensor for detecting a powder coating material without erroneous detection due to attachment and deposit of the powder coating material on the sensor.

According to an aspect of the present invention, a powder detecting capacitance-type sensor is provided for detecting powder utilizing variance of capacitance between a pair of electrodes. The sensor comprises a sensor body having a pair of interior electrodes. A protection cover covers the sensor body so as to form a compression air chamber between an outer surface of the sensor body and an inner surface of the cover. The protection cover is made of porous material, and an air inlet is communicated with the compression air chamber. Thus, compressed air can be introduced into the compression chamber through the air inlet and blown outside of the protection cover through the protection cover.

DETAILED DESCRIPTION OF THE PREFERRED EMBODIMENTS

Figure 1:
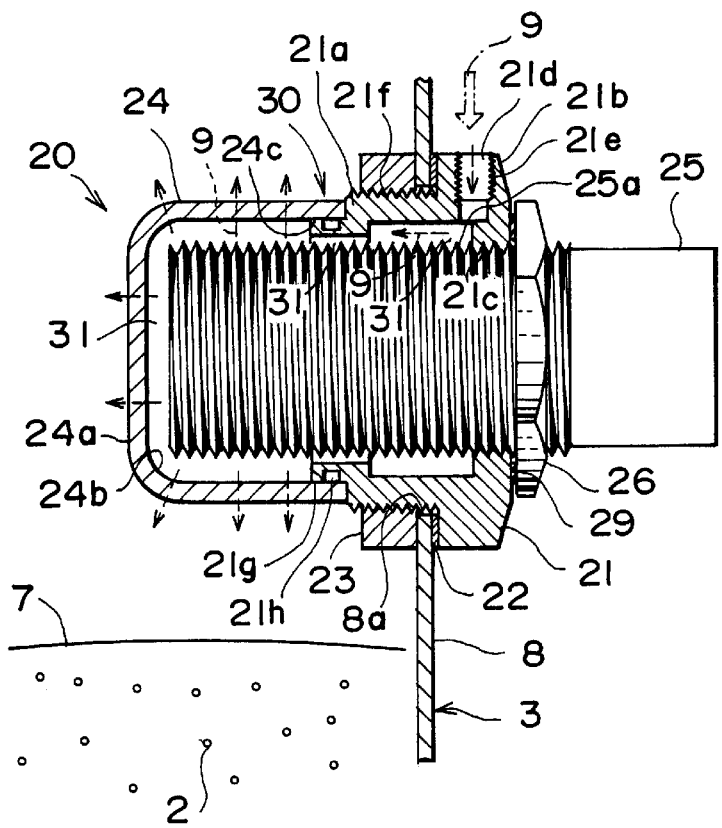
FIG. 1 is a side view showing a structure of a capacitance-type sensor according to an embodiment of the present invention.
Figure 2:
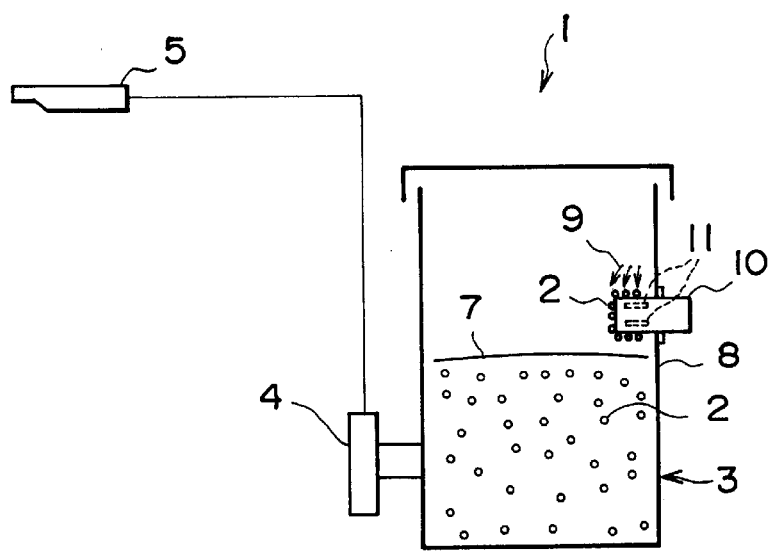
FIG. 2 is a view showing a schematic representation of a capacitance powder coating apparatus using a conventional capacitance-type sensor.

An embodiment of the present invention will be described with reference to the accompanying drawings. FIG. 1 shows a structure of a capacitance-type sensor 20, according to the embodiment of the present invention, for detecting a powder coating material. The capacitance-type sensor 20 is arranged at the same location as the capacitance-type sensor 10 shown in FIG. 2.

A cylindrical sensor attaching hole 8a is formed in a side wall 8 of the powder tank 3, in which a powder coating material 2 has accumulated. The capacitance-type sensor 20, for detecting a powder coating material, is inserted and secured in the sensor attaching hole 8a.

The capacitance-type sensor 20 comprises a sensor body 25, a protection cover unit 30 having a cover guide 21 and a protection cover 24, a nut 23 for fixing the protection cover unit 30, and a nut 26 for attaching the capacitance-type sensor 20.

The cover guide 21 comprises a cylindrical portion 21a, which is substantially cylindrical, and a flange portion 21b forming a flange extending from the cylindrical portion 21a. The outer surface portion of the cylindrical portion 21a comprises two cylindrical surfaces with different diameters. A male thread 21f is disposed on a large-diameter side of the cylindrical surface. An annular channel 21h, having a rectangular cross section, is formed on a small-diameter side of the cylindrical surface 21g of the cover guide 21.

The substantially cup-shaped protection cover 24 is disposed inside of the powder tank 3 so as to cover the sensor body 25. An open side portion 24c of the protection cover 24 is in contact with the small-diameter side cylindrical surface 21g of the cover guide 21 and covers the channel 21h. The protection cover 24 is fixed to the cover guide 21 so that the protection cover unit 30 constitutes a single unit. The protection cover 24 is made of porous material for the purpose of permitting the compressed air to flow from an inner surface 24b facing the sensor body 25 toward an outer surface 24a, which is exposed to the powder coating material 2 contained in the powder tank 3. The porous material is made of half-sinter in which a batch of particulate polyethylene having a size of about 10 μm is bound by heating. The diameter of the holes formed in this porous material is about 10 μm to about 15 μm.

A space, which is delimited by the protection cover 24, the cover guide 21 and the sensor body 25, communicates with an air inlet 21d and constitutes a compression chamber 31.

The inner surface 24b of the protection cover 24 constitutes a part of an inner wall of the compression chamber 31.

A cover-unit-fixing nut 23 is screwed on the male thread 21f formed on the large-diameter cylindrical surface of the cover guide 21. Accordingly, the cover-unit-fixing nut 23 is fixed to the powder tank 3 by the connection to the protection unit 30, which is inserted from outside of the powder tank 3 through the sensor attaching hole 8a. A rubber plate-shaped packing 22 is mounted on the flange portion 21b of the cover guide 21.

A female thread 21c is provided on one end of an inner circumferential surface of the cover guide 21. The inner diameter of the other end of the inner circumferential surface of the cover guide 21 is larger than the outer diameter of the sensor body 25. The inner diameter of the intermediate portion of the inner circumferential surface is larger than the inner diameter of the other end of the inner circumferential surface. Consequently, a space, which constitutes a part of the compression chamber 31, is formed between the inner circumferential surface of the flange portion 21b and the outer circumferential surface of the sensor body 25. The air inlet 21d, which penetrates from an outer circumferential surface of the flange portion 21b through the inner circumferential surface to permit the introduction of compressed air 9, is formed in the cover guide 21. A male thread 21e is formed in the air inlet 21d so as to permit the connection of a tube for introducing the compressed air 9.

The sensor body 25 has a pair of electrodes (not shown) inside the sensor body 25 and a circuit which detects change of capacitance between these electrodes so as to detect the existence of powder or an amount of powder adjacent the sensor body 25. The sensor body 25 is substantially cylindrical. A male thread 25a is provided so as to extend from the end of the sensor body 25 for a predetermined length on the outer cylindrical surface of the sensor body 25.

The sensor body 25 is screwed into the cover guide 21 from the outer surface side of the powder tank 3 so as to permit the sensor body 25 to be located in an arbitrary position relative to the side wall 8 of the powder tank 3. Disposed on the outer cylindrical surface of the sensor body 25 is a rubber plate-shaped packing 29 adjacent to the flange 21b of the cover guide 21. Furthermore a sensor attaching nut 26 is disposed adjacent to the packing 29. The sensor attaching nut 26 is screwed onto the sensor body 25 against the cover guide 21 so as to fix the sensor body 25 in the cover guide 21.

Next, an operation of the capacitance-type sensor 20 according to the embodiment will be described.

The compressed air 9 is introduced from the air inlet 21d to the compression air chamber 31. The compressed air 9 passes from the inner surface 24b side of the protection cover 24 through the outer surface 24a side thereof and blows towards the inside of the powder tank 3. The compressed air 9 blowing towards the outer surface 24a side prevents the powder coating material 2 from attaching and depositing on the outer surface 24a of the protection cover 24. Even though the powder coating material 2 will attach and deposit on the outer surface 24a when the compressed air 9 is not supplied to the capacitance-type sensor 20, it can be subsequently removed by the supply of compressed air 9.

As described above, since the compressed air 9 that is introduced from the air inlet 21d blows outside through the protection cover 24, the attachment or deposit of the powder on the capacitance-type sensor 20 is prevented, and thus errors in judging the powder layer level 7 by the capacitance-type sensor 20 are prevented. Furthermore, rubbing and wearing of the surface of the capacitance-type sensor 10 is also prevented.

What is claimed is:

1. A powder detecting capacitance-type sensor for detecting powder utilizing variance of capacitance between a pair of electrodes, said capacitance-type sensor comprising:

a sensor body having a pair of electrodes disposed inside of said sensor body;

a protection cover surrounding a portion of said sensor body so as to form a compression air chamber between an outer surface of said sensor body and an inner surface of said protection cover, wherein said protection cover is formed of a porous polyethylene material; and an air inlet communicated with the compression air chamber to permit compressed air to be introduced into the compression air chamber and blown through said porous protection cover to remove powder from the outside surface of said protection cover.

2. The powder detecting capacitance-type sensor as claimed in claim 1, further comprising:

a cover guide supporting said sensor body and said protection cover, wherein said air inlet is formed in said cover guide.

3. The powder detecting capacitance-type sensor as claimed in claim 1, wherein said porous polyethylene protection cover is made of a half-sintered polyethylene material.

4. A powder detecting capacitance-type sensor for sensing a powder level in a powder tank by utilizing variance of capacitance between a pair of electrodes, said capacitance-type sensor comprising:

a sensor body having a pair of electrodes disposed inside of said sensor body; and a protection cover unit comprising a cover guide received on said sensor body, and a protection cover attached to said cover guide so as to surround a portion of said sensor body, said cover guide having a cylindrical portion and a flange portion extending from said cylindrical portion, wherein said cylindrical portion is adapted to be received in an opening in a wall of the powder tank, and said flange portion includes an air inlet;

said protection cover being attached to an end of said cylindrical portion and spaced from said sensor body so as to form a compression air chamber between an outer surface of said sensor body and an inner surface of said protection cover, wherein said protection cover is formed of a porous polyethylene material, and said air inlet is in communication with the compression air chamber to permit compressed air to be introduced into the compression air chamber from the air inlet and blown through said porous protection cover in order to remove powder from substantially the entire outer peripheral surface of said protection cover.

5. The powder detecting capacitance-type sensor as claimed in claim 4, wherein said cylindrical portion includes a small diameter portion and a large diameter portion, and wherein said protection cover is received on said small diameter portion.

6. The powder detecting capacitance-type sensor as claimed in claim 5, wherein an outer peripheral surface of said large diameter portion is provided with threads for receiving a nut.

7. The powder detecting capacitance-type sensor as claimed in claim 4, wherein said porous polyethylene protection cover is made of a half-sintered polyethylene material.

* * * * *